US011238835B2

(12) United States Patent
Xu et al.

(10) Patent No.: US 11,238,835 B2
(45) Date of Patent: Feb. 1, 2022

(54) APPARATUS AND METHOD FOR DECONFLICTING COMPETING CROSS REALITY ENGAGEMENTS

(71) Applicant: AT&T Intellectual Property I, L.P., Atlanta, GA (US)

(72) Inventors: Tan Xu, Bridgewater, NJ (US); Bo Han, Bridgewater, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/792,397

(22) Filed: Feb. 17, 2020

(65) Prior Publication Data

US 2021/0256938 A1 Aug. 19, 2021

(51) Int. Cl.
*G09G 5/377* (2006.01)
*G06Q 30/02* (2012.01)
*H04L 29/06* (2006.01)

(52) U.S. Cl.
CPC ......... *G09G 5/377* (2013.01); *G06Q 30/0251* (2013.01); *H04L 63/083* (2013.01); *G09G 2354/00* (2013.01)

(58) Field of Classification Search
CPC ............... G09G 5/377; G09G 2354/00; G06Q 30/0251; H04L 63/083
See application file for complete search history.

(56) References Cited

U.S. PATENT DOCUMENTS

2013/0085851 A1* 4/2013 Pedro ................ G06Q 30/0255
705/14.53

OTHER PUBLICATIONS

Lebeck, Kiron et al., "Enabling Multiple Applications to Simultaneously Augment Reality: Challenges and Directions", https://homes.cs.washington.edu/~kklebeck/lebeck-hotmobile19.pdf, HotMobile '19, Feb. 27-28, 2019, 6 pages.
Lebeck, Kiron et al., "How to Safely Augment Reality: Challenges and Directions", https://homes.cs.washington.edu/~kklebeck/hotmobile16.pdf, Hot Mobile '16, Feb. 23-24, 2016, 6 pages.
Youtube, "HotMobile 2019—Enabling Multiple Applications to Simultaneously Augment Reality", https://www.youtube.com/watch?v=0bcxTI0oRdc, HotMobile 2019—the 20th International Workshop on Mobile Computing Systems and Applications, Mar. 30, 2019, 3 pages.

* cited by examiner

*Primary Examiner* — Sing-Wai Wu
(74) *Attorney, Agent, or Firm* — Guntin & Gust, PLC; Mark Wilinski

(57) ABSTRACT

Aspects of the subject disclosure may include, for example, presenting a first virtual object in accordance with a first context associated with a first user engaged in a communication session via a first application, presenting a second virtual object in accordance with a second context associated with a second user engaged in the communication session via a second application, identifying a conflict between the presenting of the first virtual object and the presenting of the second virtual object, a presenting of a physical object, or a combination thereof, and responsive to the identifying of the conflict, modifying the first virtual object, the second virtual object, or a combination thereof. Other embodiments are disclosed.

20 Claims, 7 Drawing Sheets

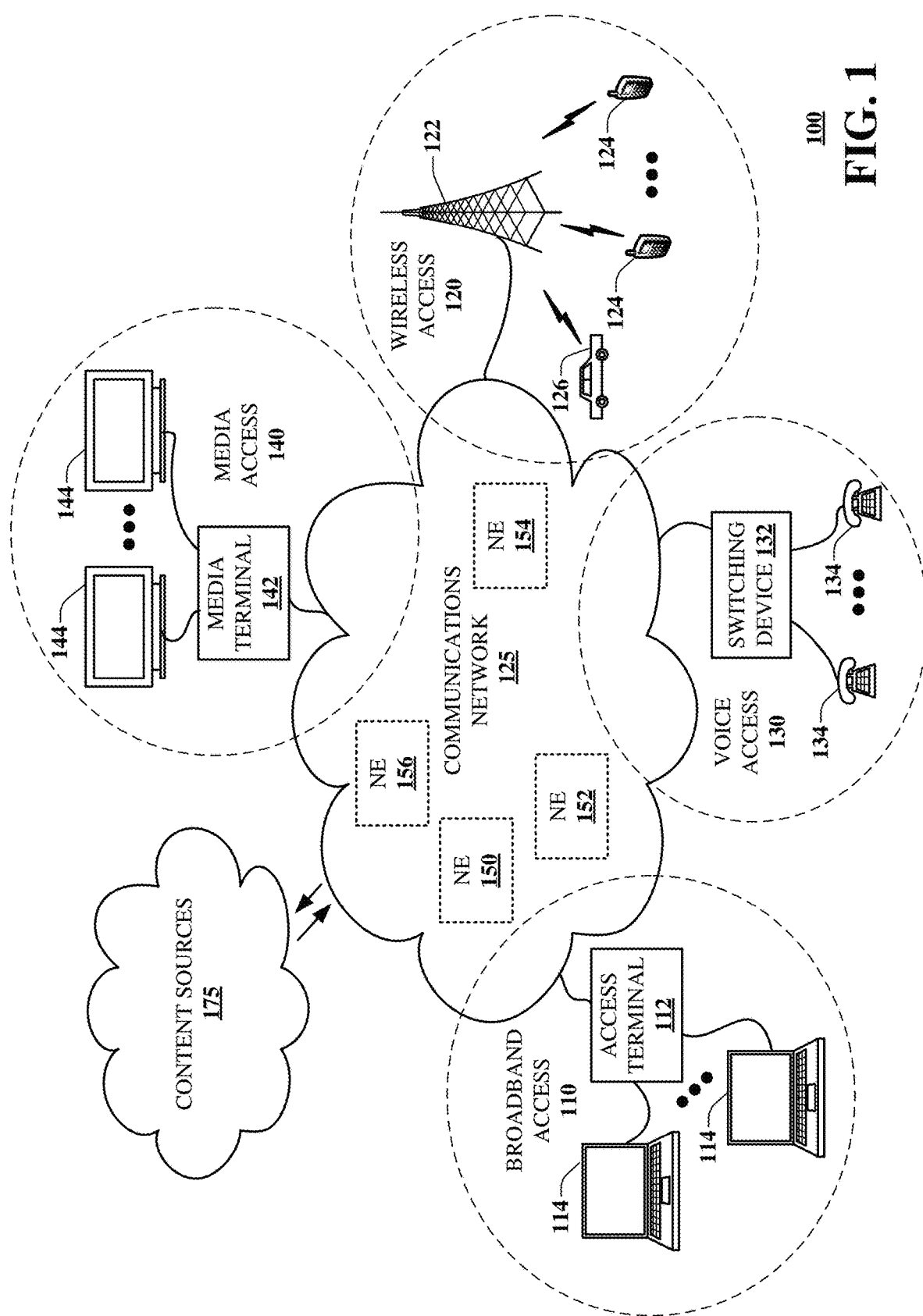

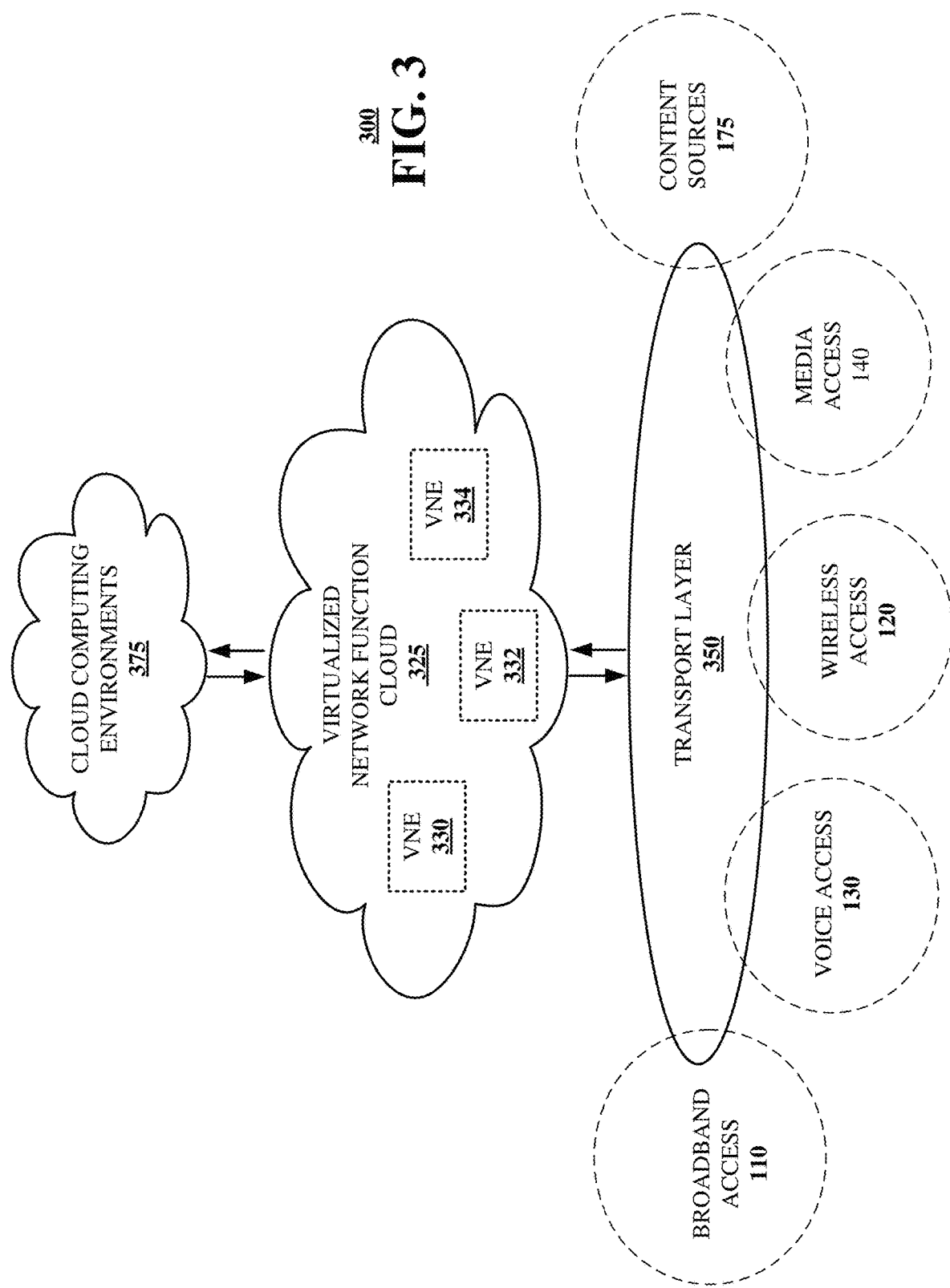

APPARATUS AND METHOD FOR DECONFLICTING COMPETING CROSS REALITY ENGAGEMENTS

FIELD OF THE DISCLOSURE

The subject disclosure relates to an apparatus and method for deconflicting competing cross reality engagements.

BACKGROUND

As the world becomes increasingly connected through vast communication networks and systems, additional opportunities are available for users to consume content, such as media. Additionally, such content is frequently available in cross reality or extended reality (XR) formats/environments/experiences. XR is a form of mixed/augmented reality resulting from a fusion/union of sensor/actuator outputs, physical objects, and virtual worlds/objects. XR may be presented by a communication device via an execution of one or more applications by the communication device.

In many instances, the amount of content or objects that may be presented to a user in conjunction with an XR application or environment may overwhelm the user. For example, a first object (e.g., a virtual or a physical object) may be obscured/concealed by a second object (e.g., a virtual object). Still further, in a multi-user application environment, it is not immediately clear how objects (e.g., virtual objects) should be managed/controlled/presented across users.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
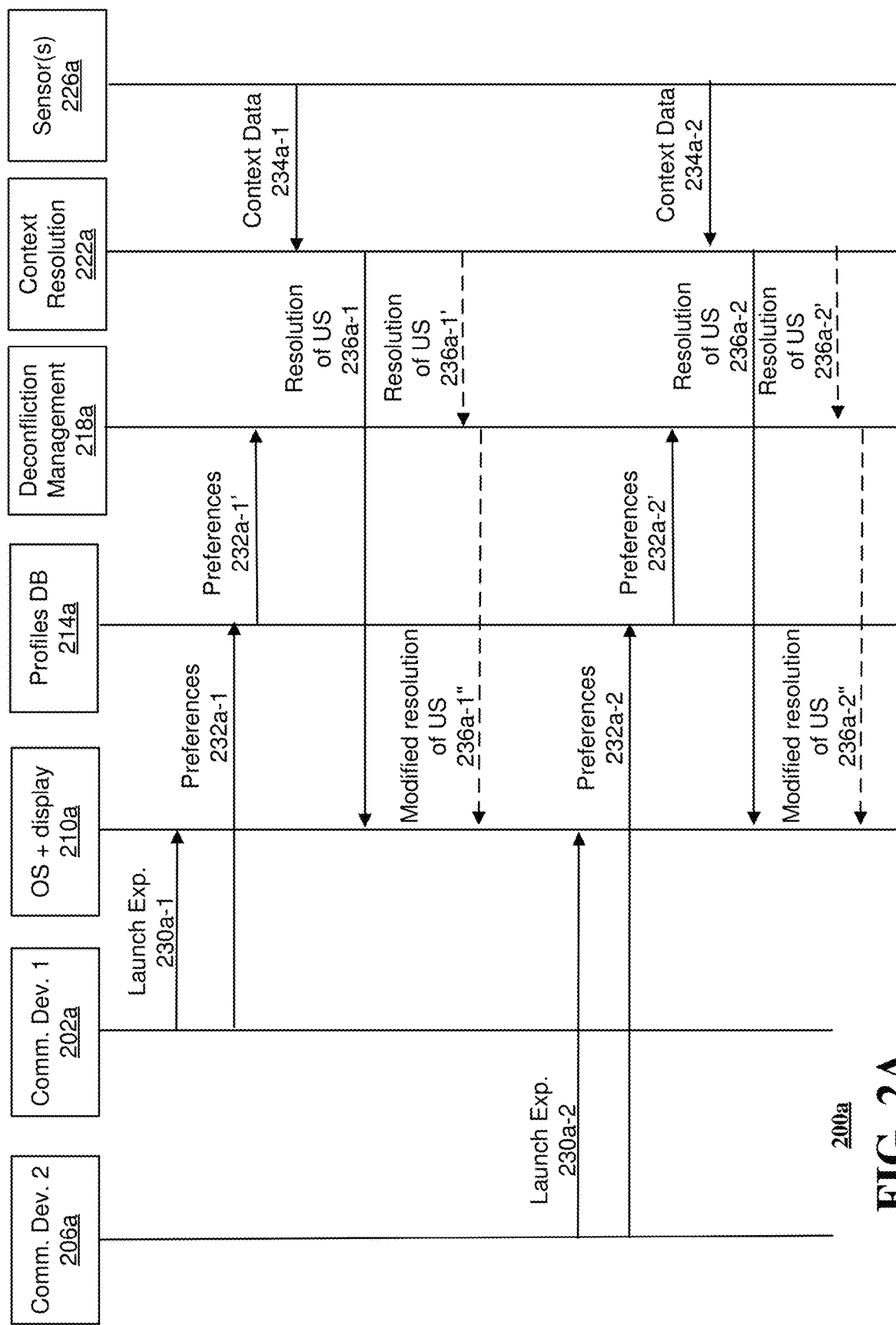
FIG. 2A is a block diagram illustrating an example, non-limiting embodiment of a system functioning within the communication network of FIG. 1 in accordance with various aspects described herein.

The subject disclosure describes, among other things, illustrative embodiments for managing presentations of objects and altering the presentations and/or the objects in response to detecting/determining that a conflict exists. Other embodiments are described in the subject disclosure.

One or more aspects of the subject disclosure include presenting, in a first presentation, a first physical object and a first virtual object on a first display in accordance with an execution of a first application invoked by a first user equipment, presenting, in a second presentation, a second physical object and a second virtual object on a second display in accordance with an execution of a second application invoked by a second user equipment, determining that the second virtual object has a conflict with the first physical object, the first virtual object, or a combination thereof, responsive to the determining that the second virtual object has the conflict, resolving the conflict by determining a relative priority between the second virtual object and the first physical object, the first virtual object, or a combination thereof, and modifying the first presentation, the second presentation, or a combination thereof in accordance with the resolving of the conflict.

One or more aspects of the subject disclosure include invoking a first application that facilitates a first presentation of a first virtual object, a first physical object, or a combination thereof, invoking a second application that facilitates a second presentation of a second virtual object, a second physical object, or a combination thereof, wherein the second application is different from the first application, identifying a conflict between the second virtual object, the second physical object, or the combination thereof, and the first virtual object, the first physical object, or the combination thereof, and responsive to the identifying of the conflict, modifying the first presentation, the second presentation, or a combination thereof.

One or more aspects of the subject disclosure include presenting a first virtual object in accordance with a first context associated with a first user engaged in a communication session via a first application, presenting a second virtual object in accordance with a second context associated with a second user engaged in the communication session via a second application, identifying a conflict between the presenting of the first virtual object and the presenting of the second virtual object, a presenting of a physical object, or a combination thereof, and responsive to the identifying of the conflict, modifying the first virtual object, the second virtual object, or a combination thereof.

Referring now to FIG. 1, a block diagram is shown illustrating an example, non-limiting embodiment of a system 100 in accordance with various aspects described herein. For example, system 100 can facilitate in whole or in part presenting, in a first presentation, a first physical object and a first virtual object on a first display in accordance with an execution of a first application invoked by a first user equipment, presenting, in a second presentation, a second physical object and a second virtual object on a second display in accordance with an execution of a second application invoked by a second user equipment, determining that the second virtual object has a conflict with the first physical object, the first virtual object, or a combination thereof, responsive to the determining that the second virtual object has the conflict, resolving the conflict by determining a relative priority between the second virtual object and the first physical object, the first virtual object, or a combination thereof, and modifying the first presentation, the second presentation, or a combination thereof in accordance with the resolving of the conflict. System 100 can facilitate in whole or in part invoking a first application that facilitates a first presentation of a first virtual object, a first physical object, or a combination thereof, invoking a second application that facilitates a second presentation of a second virtual object, a second physical object, or a combination thereof, wherein the second application is different from the first application, identifying a conflict between the second virtual object, the second physical object, or the combination thereof, and the first virtual object, the first physical object, or the combination thereof, and responsive to the identifying of the conflict, modifying the first presentation, the second presentation, or a combination thereof. System 100 can facilitate in whole or in part presenting a first virtual object in accordance with a first context associated with a first user engaged in a communication session via a first application, presenting a second virtual object in accordance with a second context associated with a second user engaged in the communication session via a second application, identifying a conflict between the presenting of the first virtual object and the presenting of the second virtual object, a presenting of a physical object, or a combination thereof, and responsive to the identifying of the conflict, modifying the first virtual object, the second virtual object, or a combination thereof.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200a functioning within, or operatively overlaid upon, the communication network 100 of FIG. 1 in accordance with various aspects described herein. The system 200a may include a first communication device 202a, a second communication device 206a, one or more operating systems (OSs) and/or displays 210a, a profiles database (DB) 214a, a deconfliction management device 218a, a context resolution device 222a, and one or more sensors 226a. While shown separately in FIG. 2A, in some embodiments a first of the devices/entities (e.g., the deconfliction management device 218a) may be combined with one or more other devices/entities (e.g., the context resolution device 222a); the OS and display 210a may be included as part of the first communication device 202a and/or the second communication device 206a. One or more steps or operations that may be performed or facilitated by the system 200a are described below. In short, the system 200a may be used to control and manage a presentation of objects (e.g., audiovisual objects), inclusive of one or more virtual objects and/or one or more physical objects.

In step 230a-1, the first communication device 202a may launch an XR experience. For example, as part of step 230a-1, a user-generated input may cause an XR application to launch on the first communication device 202a. In some embodiments, step 230a-1 may entail a first user of the first communication device 202a supplying a credential (e.g., a fingerprint or biometric scan, a username, a password, a personal identification number [PIN], etc.) that is subject to validation/verification as part of a product or a service.

In step 232a-1, the first communication device 202a may generate and/or provide preferences. The preferences of step 232a-1 may be based at least in part on one or more user inputs. In some embodiments, the preferences of step 232a-1 may be at least partially inferred based on an occurrence of one or more events or conditions. In some embodiments, the preferences of step 232a-1 may be based at least in part on a history of the first user associated with the first communication device 202a (or another communication device). For example, the preferences of step 232a-1 may be based on a log/record of a consumption of media by the first user of the first communication device 202*a* and/or a log/record of a presentation of media by the first communication device 202*a*.

The preferences of step 232*a*-1 may be obtained by, e.g., the profiles DB 214*a*. The preferences may be stored and managed by the profiles DB 214*a*, potentially in connection with a profile for the first communication device 202*a* and/or the first user of the first communication device 202*a*. Subject to any additional processing (e.g., filtering) that may be performed by/at, e.g., the profiles DB 214*a*, the preferences may be provided to the deconfliction management device 218*a* as shown in step 232*a*-1' The preferences may include a specification of eye calibration information, gesture controls, display settings, audio settings, etc.

In step 234*a*-1, context/contextual data may be provided by the sensors 226*a* to the context resolution device 222*a*. While not specifically shown in FIG. 2A, in some embodiments the contextual data of step 234*a*-1 may be based on outputs from, e.g., the first communication device 202*a* and/or the second communication device 206*a*. In some embodiments, the contextual data of step 234*a*-1 may be based on a monitoring of (an environment, an input, and/or an output associated with) the first communication device 202*a* and/or the second communication device 206*a*. In some embodiments, the contextual data of step 234*a*-1 may be based on an interaction of a user with one or more physical objects and/or one or more virtual objects, a manipulation of an environment (e.g., a change in a resolution or a dimension of a displayed field of view as part of the OS and display 210*a*, a change in volume or other setting associated with an output audio device, etc.), or other factors/conditions. The contextual data of step 234*a*-1 may be based one or more parameters, such as vision, sound, depth, motion, orientation, location, gaze, temperature, etc. In some embodiments, the contextual data of step 234*a*-1 may be based on a recognition of one or more gestures (e.g., a kick, a swipe, a punch, pinching fingers together or expanding/extending fingers away from one another) that may correspond to a command for controlling/managing an object, a display/monitor, an audio device (associated with the first communication device 202*a*, the second communication device 206*a*, the OS and display 210*a*, or any combination thereof), etc. In some embodiments, such commands may be embodied as oral commands (potentially in conjunction with one or more speech and/or audio processing algorithms).

In step 236*a*-1, the context resolution device 222*a* may generate and/or provide a resolution of a user state (US) for the first communication device 202*a* (or, analogously, a first user of the first communication device 202*a*) based on the contextual data of step 234*a*-1. As used herein, a resolution of a US may entail/include selectively presenting (e.g., may include a visual rendering, an audio rendering, etc.) one or more objects (e.g., virtual objects and/or physical objects) as part of, e.g., the display 210*a*. In some embodiments, the resolution of the US may entail omitting from a presentation one or more objects.

Aspects of the system 200*a* may incorporate artificial intelligence (AI) and machine learning (ML) as part of, e.g., the resolution of the US in step 236*a*-1, or a future execution of step 236*a*-1. For example, as the system 200*a* gains experience over time, the system 200*a* (e.g., the context resolution device 222*a*) may determine: which objects are important (or, analogously, unimportant), which objects are inside or outside of a given scope or viewing/auditory perspective, etc. In this regard, the system 200*a* (e.g., the context resolution device 222*a*) may selectively prioritize or de-emphasize a given object as part of a presentation in connection with such determinations.

Prioritization or de-emphasis of a given object (as part of step 236*a*-1) may be based on a degree or extent to which the given object appears. In some embodiments, prioritization or de-emphasis may include an application of special effects (e.g., highlighting, blinking, enlarging, shading/obscuring, blurring, etc.) to the given object.

Prioritization or de-emphasis of a given object (as part of step 236*a*-1) may include presenting the given object within a particular layer, window, or slide of a multi-layered/multi-window/multi-slide presentation. For example, if the given object is deemed/declared to be important (e.g., important in an amount greater than a threshold), that object may appear in a first or early layer of a plurality of layers. Conversely, if the given object is deemed/declared to be unimportant, that object may appear towards the end of the layers.

In some embodiments, security aspects may be applied to an object, potentially based on a relative importance of the object, as part of step 236*a*-1. For example, objects that are deemed/declared to be important in an amount greater than a threshold may require a submission of one or more verified/validated credentials in order to be removed/deleted and/or altered as part of a presentation. In this regard, important objects (e.g., warning notices of dangerous conditions) might not be inadvertently overlooked or discarded of.

In some embodiments, aspects of time may influence/impact the presentation of one or more objects as part of step 236*a*-1. For example, a given object may be at least partially hidden or obscured from view as part of a presentation until a threshold amount of time has passed. The threshold amount of time may be static in nature—e.g., may be a specified value, such as 100 seconds. In some instances, the threshold amount of time may be dynamic in nature, and may be based on an occurrence (or analogously, an omission) of one or more events or conditions. For example, in connection with a presentation of a panoramic video, objects (e.g., controls associated with a playback of the video) may be hidden from a field of view until the first user of the first communication device 202*a* actuates an actuator (e.g., a button, key, or switch) of the first communication device 202*a*.

In some embodiments, a decision/determination as to whether to present a given object (and/or in what form to present the given object), as part of step 236*a*-1, may be based on a level or extent of attentiveness of a user. For example, if the first communication device 202*a* has more than a threshold number of applications executing, an assumption may be made that the first user might not be ready to consume a presentation of the object. Similarly, if use of the object requires a high degree of skill (e.g., skill in an amount that is greater than a threshold) that a user does not currently possess, a presentation of the object may be deferred/delayed until the user has undergone training or received an education in respect of the use of the object. In some embodiments, reminders may be triggered regarding a presentation of the object or any activities that the user may need/want to undertake in respect of the object (such as for example the training referred to above). In this respect, such reminders may be tied to a calendar application that may be executed by one or more of the devices of the system 200*a*.

While the resolution of the US for the first user/first communication device 202*a* is shown as being provided by the context resolution device 222*a* to the OS and display 210*a* in FIG. 2A, in some embodiments the deconfliction management device 218a may intercept the resolution of the US (as represented by step 236a-1') and modify the resolution of the US in accordance with the preferences of step 232a-1', resulting in a modified resolution of the US. The modified resolution of the US may then be provided by the deconfliction management device 218a to the OS and display 210a as shown in step 236a-1".

Thus, in accordance with steps 230a-1, 232a-1, 232a-1', 234a-1, 236a-1 (and/or 236a-1' and 236a-1"), aspects of this disclosure may be used to control/regulate/manage a presentation of one or more objects. For example, objects may be selectively presented to the first user of the first communication device 202a in accordance with preferences of the first user and/or in accordance with contextual data that may pertain to the first user, the first communication device 202a, or any other user or communication device.

By analogy, the steps 230a-1, 232a-1, 232a-1', 234a-1, 236a-1, 236a-1', and 236a-1" with respect to the first user/first communication device 202a may be performed with respect to a second user/the second communication device 206a. For example, FIG. 2A illustrates steps 230a-2, 232a-2, 232a-2', 234a-2, 236a-2, 236a-2', and 236a-2" with respect to the second user/the second communication device 206a that may be substantially similar to the respective -1 counterpart steps 230a-1, 232a-1, 232a-1', 234a-1, 236a-1, 236a-1', and 236a-1" described above. As such, a complete re-description of steps 230a-2, 232a-2, 232a-2', 234a-2, 236a-2, 236a-2', and 236a-2" is omitted herein for the sake of brevity.

To the extent that multiple users or multiple communication devices, such as for example the first communication device 202a and the second communication device 206a, are engaged in a common XR experience (which may be implemented/embodied, in whole or in part, as one or more communication sessions), the system 200a (e.g., the OS and display 210a) may support the XR experience from the perspective of each of the users/communication devices. To the extent that there is a conflict between the users or communication devices in relation to the XR experience, logic that may be present in, e.g., the deconfliction management device 218a and/or the context resolution device 222a may arbitrate the conflict and award priority to one or more of the users or communication devices. As an illustrative example, if the first user of the first communication device 202a prefers a first viewing perspective with respect to a given virtual object and the second user of the second communication device 206a prefers a second viewing perspective with respect to the given virtual object that is different from the first viewing perspective, (one or more devices of) the system 200a may select which of the first viewing perspective or the second viewing perspective to utilize. If a resolution to the conflict is unavailable, an additional XR experience (e.g., an additional communication session) may be spawned from the common XR experience to facilitate multiple XR experiences (e.g., one for each of the communication devices 202a and 206a). One or more parameters associated with the common XR experience may be carried-over/carried-forward to the additional XR experience in order to maintain at least some consistency between the additional XR experience and the common XR experience from which the additional XR experience was spawned.

In some embodiments, a decision/determination to admit a user or communication device to an XR experience may be based on permission being granted to the user or communication device. For example, an administrative user or device may selectively grant access to the XR experience. One or more validation or verifications schemes may be utilized to selectively enable a user or communication device to participate in an XR experience.

One or more of the steps shown in FIG. 2A may be executed repeatedly or iteratively, potentially as part of one or more AI or ML-based algorithms. For example, as part of such an execution, snapshots may be taken at various (e.g., periodic) intervals in terms of user preferences, application preferences, and environmental/contextual data for future reuse with other XR experiences.

Figure 2B:
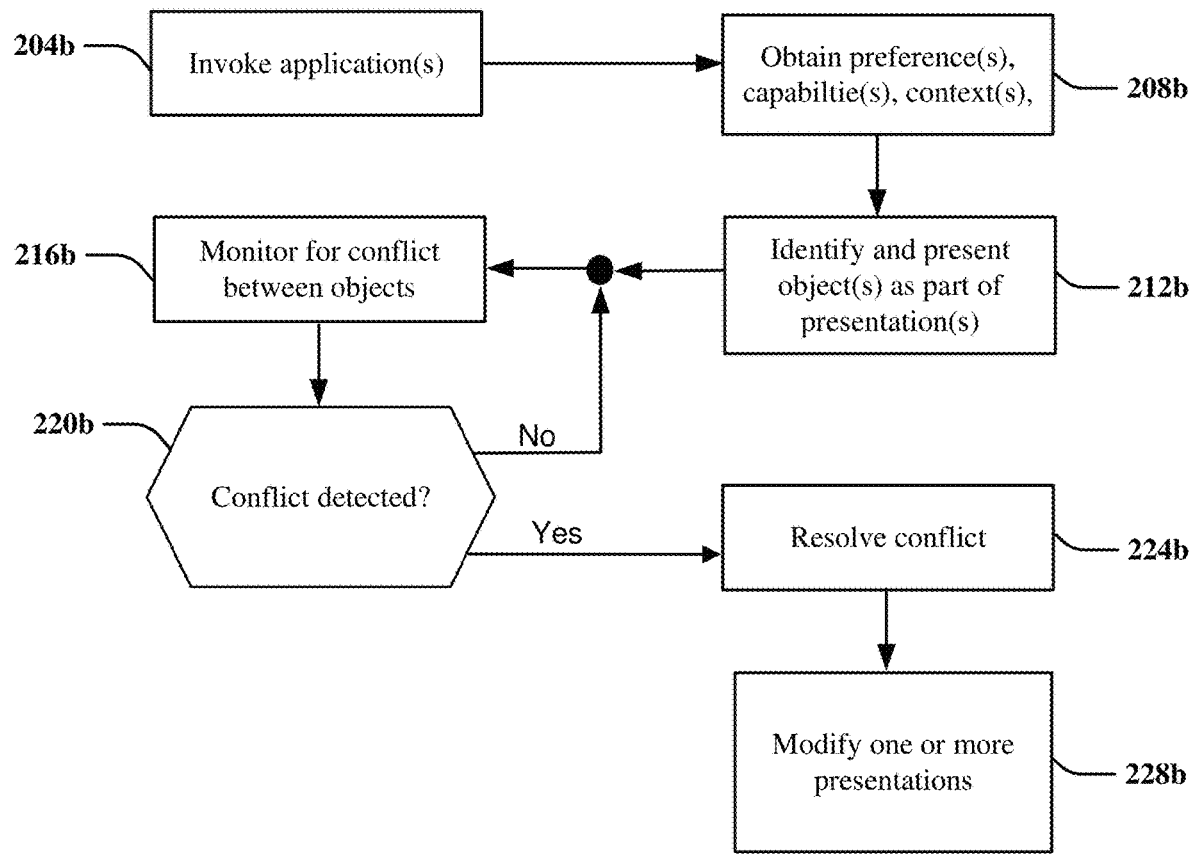
FIG. 2B depicts an illustrative embodiment of a method in accordance with various aspects described herein.

FIG. 2B depicts an illustrative embodiment of a method 200b in accordance with various aspects described herein. In some embodiments, the method 200b may be partially or wholly executed by one or more systems, devices, and/or components, such as for example the systems, devices, and components set forth herein. While shown separately, in some embodiments one or more of the steps of FIG. 2A may be implemented/practiced in conjunction with one or more blocks/operations of the method 200b. As described in further detail below, the method 200b may be used/executed to control/regulate/manage one or more presentations of one or more objects in accordance with preferences, device capabilities, interactions, contextual data, or any combination thereof.

In block 204b, one or more applications may be invoked by one or more devices, such as for example one or more communication devices. For example, the invocation of an application may include launching the application on a user equipment. As part of invoking an application, one or more communication sessions may be established. The communication session may exist between two or more devices. In some embodiments, as part of block 204b, a communication device may request a media content item. The invocation of the application of block 204b may be based on that request.

In block 208b, preferences and/or capabilities associated with one or more users and/or one or more communication devices may be obtained. As part of block 208b, contexts/contextual data associated with the users, the communication devices, and/or environments where the users or communication devices are located may be obtained. Block 208b may be performed based on, or in response to, the execution/performance of block 204b.

In block 212b, one or more objects (e.g., physical objects, virtual objects) may be identified and presented (potentially in conjunction with the applications and/or communication sessions of block 204b) as part of one or more presentations. The identification and presentation of the object(s) may be based at least in part on the preferences, capabilities, and/or contexts obtained as part of block 208b.

In block 216b, a monitoring may be performed in respect of a potential conflict between the objects of block 212b. For example, the monitoring may be performed to determine/detect whether a conflict between the objects exists as shown in block 220b. As described herein, a conflict may pertain to a spatial conflict with respect to a resource, such as a display screen/monitor, a speaker, etc. In some embodiments, a conflict may include an element of time. For example, two display screens/monitors may represent a conflict if they both would otherwise require the attention of a user at the same time. A conflict may be based at least in part on an interaction with an object.

If no conflict is detected as part of block 220b, flow may proceed back to block 216b to continue monitoring for a conflict. In this manner, a loop may be established between the monitoring of block 216b and the detection of block 220b. On the other hand, if a conflict is detected, flow may proceed from block 220b to block 224b.

In block 224b, one or more resolutions may be identified to resolve the conflict detected as part of block 220b. For example, resolution of the conflict may entail/include omitting an object from a presentation, including an object in a presentation, emphasizing or de-emphasizing an object as part of a presentation, delaying/deferring inclusion of an object as part of a presentation, spawning/generating additional presentations and/or communication sessions, etc.

In block 228b, one or more of the presentations of block 212b may be modified. The modifications may adhere/conform to the resolution(s) identified as part of block 224b.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of this disclosure may provide for an XR OS obtaining inputs associated with a context of an XR experience/environment. The context may include a virtual context, where the virtual context may include content (e.g., digital content) from one or more applications and/or one or more users. The context may include a physical context, such as for example an identification of physical objects (and parameters associated therewith). A real-time reconstruction of the XR experience/environment may be provided in terms of the virtual context and the physical context.

In some embodiments, an XR experience may be customized/tailored to user and/or device preferences. For example, the XR experience may be adapted/modified to adhere to a capability of a communication device. In some embodiments, an object included in the XR experience may be modified in accordance with a modality (e.g., audio, visual, text, etc.) of an output presentation. To demonstrate via an illustrative example, if a user equipment only has an audio output device (e.g., a speaker), an object corresponding to a story may be presented as a "book-on-tape", whereas if a determination is made that the user equipment is located at a library the story may be presented as a digital text document so as to avoid distracting other patrons/users of the library.

Aspects of this disclosure may provide for a tracking (e.g., an auditory tracking and/or a visual tracking) of one or more real-world/physical objects. In some embodiments, digital image processing techniques (e.g., foveated imaging) may be applied to control/regulate an image resolution, or amount of detail, that appears across an image in accordance with one or more fixation points. For example, a fixation point may be indicative of a high-resolution region of an image (e.g., resolution in an amount greater than a threshold) corresponding to the center of a user's eye retina. In this regard, aspects of the disclosure may employ gaze technology to determine where the center of the retina is located at any given point in time.

As described herein, aspects of the disclosure may utilization augmentation to emphasize one or more objects. In some embodiments, profile-based filtering may be applied to determine objects that are most relevant in accordance with a given context (which may be embodied in contextual data). In some embodiments, time may be used as a factor in determining a relevancy of an object, potentially as part of one or more presentations. For example, if a first object has been recently accessed (e.g., viewed, activated, etc.) that first object may be determined to be more relevant than a second object that was accessed earlier in time.

Aspects of this disclosure may be used to declutter or reorganize a presentation of one or more objects, potentially as a part of an XR experience. An XR mixing of virtual and physical worlds/objects may be obtained. In some embodiments, a given object (e.g., a virtual object) may be presented in accordance with a user's situational awareness, which is to say that the presentation of the given object may be delayed/deferred until the user is able to consume/appreciate the given object. Similarly, suggested/recommended user interactions with objects as part of an XR experience may be delayed/deferred until the user is available/capable (e.g., cognitively capable) of engaging in such interactions.

In some embodiments, multiple users may share, or otherwise engage, a resource (e.g., a display screen/monitor) as part of a presentation in connection with an XR experience. As described herein, aspects of the disclosure may prioritize user access to the resource, where a first user may receive priority relative to one or more other users. In some embodiments, access to an object included as part of the XR experience may be shared between the multiple users, potentially as a function of time. In this regard, in some embodiments the amount of access to the object may be based on one or more auction mechanisms (e.g., a bartering for time), payment of a subscription or license fee, etc. Thus, in some embodiments, access to an object may be dynamic in nature, which is to say that a handover/hand-off of the access to the object may be provided from a given user to another user.

Aspects of this disclosure may facilitate a generation and presentation of objects based on inputs from one or more users and/or one or more communication devices. As an example, aspects of the disclosure may incorporate inputs or feedback obtained from one or more sites or platforms, such as for example a social media platform. The inputs may be obtained or derived from one or more messages, posts, chats, pictures, videos, documents, and the like.

As described herein, aspects of the disclosure may be used in connection with a presentation of media. One or more objects may be included as part of a media content item. For example, a virtual object may be overlaid upon at least a portion of the media content item. In some embodiments, the media content item and/or the objects may adhere/conform to one or more transport mechanism, such as for example a streaming transport mechanism. In some embodiments, objects that may be included as part of a presentation may include a commercial or advertisement. In some embodiments, the commercial/advertisement may be selected as part of the presentation. The selection of the commercial/advertisement may facilitate a re-direction to one or more websites or webpages that may enable a user to purchase a product and/or service.

Aspects of the disclosure may enhance the safety of users that may become immersed in an XR experience. For example, important (e.g., safety-critical) real-world objects or events might not be obscured during the immersion. A management (e.g., a deconfliction) of physical objects, virtual objects, and/or user interactions may be provided to realize/achieve/obtain such enhanced safety. For example, if a user has a large amount of room/space available (e.g., room or space available in an amount greater than a threshold), the user's XR experience (which may, illustratively, correspond to a presentation of a video game) may entail/include directing the user to reach long distances. Conversely, if the user has a little amount of room/space available (e.g., room or space available in an amount less than a threshold), the user's XR experience may entail/include directing the user to utilize oral outputs in lieu of bodily movements in order to reduce the likelihood of injury or damage to the user or physical objects located in proximity to the user.

Aspects of the disclosure may be applied in connection with semi-autonomous vehicle operations. For example, aspects of the disclosure may be used to guide a user in the operation of a vehicle. If a log/record of the user's driving history suggests that the user is an inexperienced driver, the user's XR experience may provide directives for operating the vehicle at a first rate or frequency that is greater than a second rate/frequency coinciding with a more experienced driver. In connection with autonomous vehicle operations, the user's XR experience may augment physical objects located along a route of travel with content/media associated with the physical objects. For example, if a monument is located along the route, a user may be provided a selectable object that includes facts about the monument (e.g., when the monument was constructed, who constructed the monument, materials used in the construction of the monument, etc.).

Aspects of the disclosure may apply predictive technologies in order to determine what objects and/or user interactions to present or recommend/suggest to a user. For example, a user's history of travel and/or a current trajectory of travel may be analyzed to identify/predict a user's likely future location. Aspects of the disclosure may tie/relate a presentation of objects or suggested user interactions to the prediction. Still further, in some embodiments an assessment of a confidence in the prediction may be generated, which may further impact/influence the presentation of the objects and/or the suggested user interactions.

In some embodiments, an evolution in a context associated with a presentation of an XR experience may be assessed to determine whether a given object should be presented, when a given object should be presented, and whether to provide access to the object to a given user and/or communication device. In this regard, aspects of the disclosure may enhance interactions between users and communication devices that are engaged in an XR experience.

Aspects of the disclosure may provide insights for deconfliction in respect of one or more objects and/or one or more resources. For example, aspects of the disclosure may identify and/or consult with one or more autonomous agents (e.g., robots, drones, household items/devices, etc.) that may possess information or data representative of a deeper knowledge of user interaction patterns. To illustratively demonstrate, if a pedestrian is approaching a cross-walk, but the pedestrian is immersed in an XR experience (and in particular, a virtual object included as part of the XR experience) on a mobile device, a robot communicatively coupled with the drone (potentially over one or more networks) may engage a barrier to prevent the pedestrian from inadvertently walking into oncoming vehicle traffic.

Aspects of this disclosure may be used to enhance the functionality of legacy/pre-existing applications and/or communication devices. For example, aspects of this disclosure may be applied as a wrapper or rider overlaid upon a legacy application or device. Aspects of this disclosure may multiplex multiple data points, potentially in accordance with one or more algorithms, between a large set of users or devices and a given user or device.

Aspects of the disclosure may incorporate principles of state machine logic to determine when to present a given object or recommended user interaction. In this regard, a presentation of an object or recommendation of a user interaction may be a function of past outputs or conditions as well as current inputs or conditions, some or all of which may be embodied as metadata.

In some embodiments, particular objects that may be partially relevant to a presentation of an XR experience may be hidden/obscured from a user's field of view (FoV). For example, in connection with a presentation of a panoramic video (e.g., a 360 degree video), virtual objects that bear some relevance to the video but are determined to be of little interest to the user may be placed spatially behind a user's current orientation (e.g., approximately 180 degrees behind the user's forward-looking direction). In this manner, those virtual objects may be still be accessible but may require the user to turn/pivot to consume (e.g., view) the virtual objects.

Aspects of the disclosure may facilitate a presentation on a space-constrained display. For example, in some embodiments a communication device may be executing multiple applications concurrently/simultaneously, where each of the applications may provide/include its own contextual data, objects, inputs, outputs, etc. Aspects of the disclosure may prioritize/identify which applications should be allocated space on the display, the amount or extent of space assigned to each application, etc. The allocation may be dynamic in nature and may evolve in response to one or more user-generated inputs or feedback, an occurrence of one or more events or conditions, etc. Each application may be assigned a physical boundary in order to prevent the applications from colliding/conflicting in terms of time and/or space.

Aspects of the disclosure may be applied in connection with one or more resources, such as for example one or more displays/display devices. In some embodiments, a display may be integrated as part of a communication device (e.g., a user equipment) or coupled to the communication device. For example, a display may communicate with a communication device via a tethered connection or may communicate via a wireless link/connection with the communication device.

In some embodiments, a determination that a conflict exists between objects and/or resources may be based at least in part on a determination that a user or a device is authorized to access an object. In this respect, the determination of authorization may be based at least in part on validating one or more security credentials.

One or more objects may be selectively inserted into a presentation in accordance with one or more conditions or criteria being satisfied. In some embodiments, an environment where a user or a communication device may be monitored. When the monitored environment satisfies specified parameters/thresholds, an object may be inserted into (or, analogously, omitted from) one or more presentations.

As described herein, aspects of the disclosure may facilitate a spawning or generation of additional presentations or communication sessions. For example, as part of resolving a conflict between two or more objects, a presentation associated with a first resource and a first communication session may be reallocated or reassigned to a second resource and/or a second communication session. One or more parameters associated with the first resource and/or the first communication session may be incorporated as part of the second resource and/or the second communication session in order to reduce (e.g., minimize) any disruptions that might otherwise occur.

Aspects of the disclosure may incorporate an object (e.g., a virtual object) as part of multiple presentations. For example, in connection with a distance-learning application, a teacher/instructor may present subject matter to students by demonstrating/invoking a virtual object that may be capable of being viewed from multiple viewing perspectives. The teacher may alter the viewing perspective (e.g., from a first viewing perspective to a second viewing perspective) as part of interacting with the virtual object. The alteration to the viewing perspective may be replicated on communication devices of the students.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1, 2A, and 2B. For example, virtualized communication network 300 can facilitate in whole or in part presenting, in a first presentation, a first physical object and a first virtual object on a first display in accordance with an execution of a first application invoked by a first user equipment, presenting, in a second presentation, a second physical object and a second virtual object on a second display in accordance with an execution of a second application invoked by a second user equipment, determining that the second virtual object has a conflict with the first physical object, the first virtual object, or a combination thereof, responsive to the determining that the second virtual object has the conflict, resolving the conflict by determining a relative priority between the second virtual object and the first physical object, the first virtual object, or a combination thereof, and modifying the first presentation, the second presentation, or a combination thereof in accordance with the resolving of the conflict. Virtualized communication network 300 can facilitate in whole or in part invoking a first application that facilitates a first presentation of a first virtual object, a first physical object, or a combination thereof, invoking a second application that facilitates a second presentation of a second virtual object, a second physical object, or a combination thereof, wherein the second application is different from the first application, identifying a conflict between the second virtual object, the second physical object, or the combination thereof, and the first virtual object, the first physical object, or the combination thereof, and responsive to the identifying of the conflict, modifying the first presentation, the second presentation, or a combination thereof. Virtualized communication network 300 can facilitate in whole or in part presenting a first virtual object in accordance with a first context associated with a first user engaged in a communication session via a first application, presenting a second virtual object in accordance with a second context associated with a second user engaged in the communication session via a second application, identifying a conflict between the presenting of the first virtual object and the presenting of the second virtual object, a presenting of a physical object, or a combination thereof, and responsive to the identifying of the conflict, modifying the first virtual object, the second virtual object, or a combination thereof In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
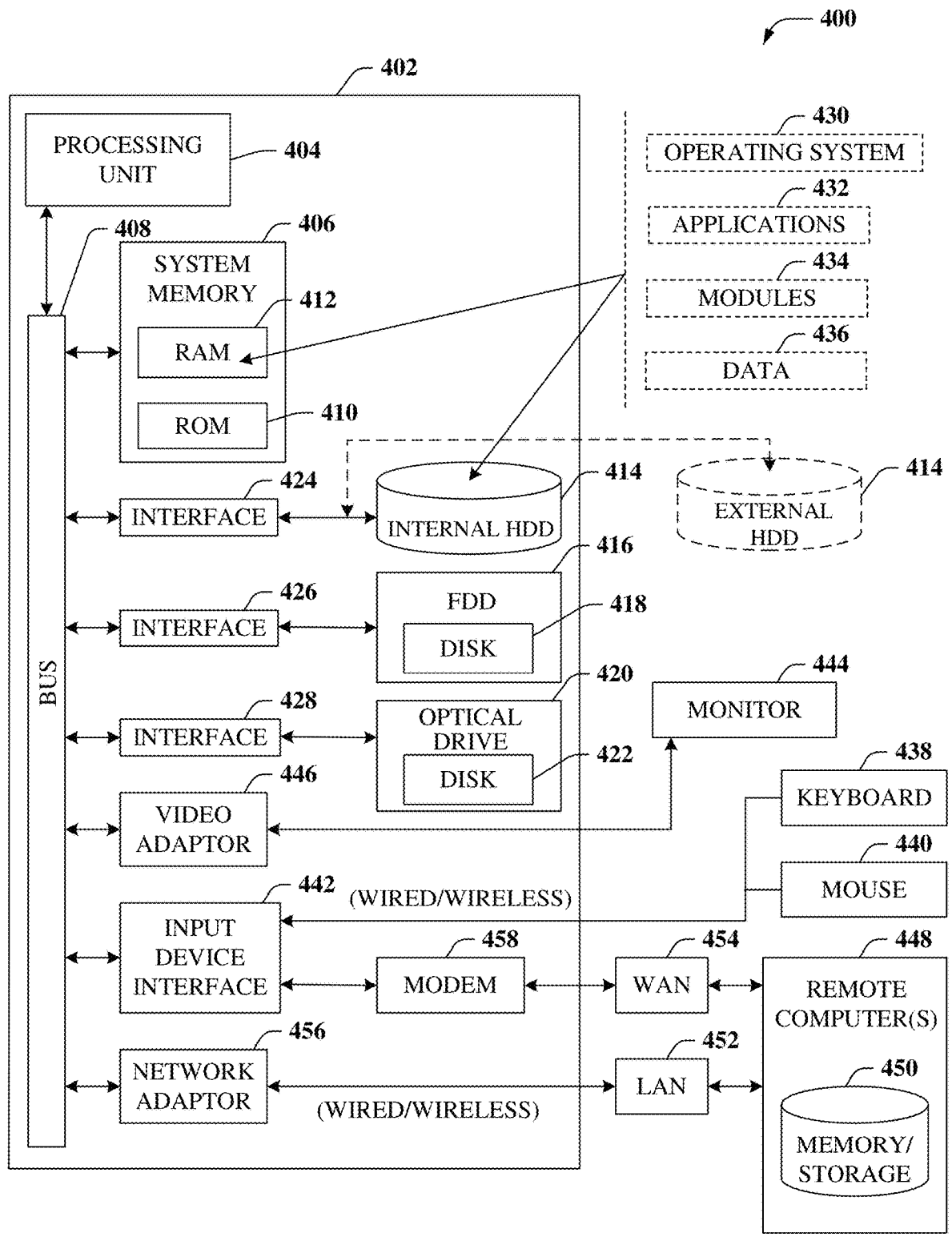
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part presenting, in a first presentation, a first physical object and a first virtual object on a first display in accordance with an execution of a first application invoked by a first user equipment, presenting, in a second presentation, a second physical object and a second virtual object on a second display in accordance with an execution of a second application invoked by a second user equipment, determining that the second virtual object has a conflict with the first physical object, the first virtual object, or a combination thereof, responsive to the determining that the second virtual object has the conflict, resolving the conflict by determining a relative priority between the second virtual object and the first physical object, the first virtual object, or a combination thereof, and modifying the first presentation, the second presentation, or a combination thereof in accordance with the resolving of the conflict. Computing environment 400 can facilitate in whole or in part invoking a first application that facilitates a first presentation of a first virtual object, a first physical object, or a combination thereof, invoking a second application that facilitates a second presentation of a second virtual object, a second physical object, or a combination thereof, wherein the second application is different from the first application, identifying a conflict between the second virtual object, the second physical object, or the combination thereof, and the first virtual object, the first physical object, or the combination thereof, and responsive to the identifying of the conflict, modifying the first presentation, the second presentation, or a combination thereof. Computing environment 400 can facilitate in whole or in part presenting a first virtual object in accordance with a first context associated with a first user engaged in a communication session via a first application, presenting a second virtual object in accordance with a second context associated with a second user engaged in the communication session via a second application, identifying a conflict between the presenting of the first virtual object and the presenting of the second virtual object, a presenting of a physical object, or a combination thereof, and responsive to the identifying of the conflict, modifying the first virtual object, the second virtual object, or a combination thereof.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in one or more embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
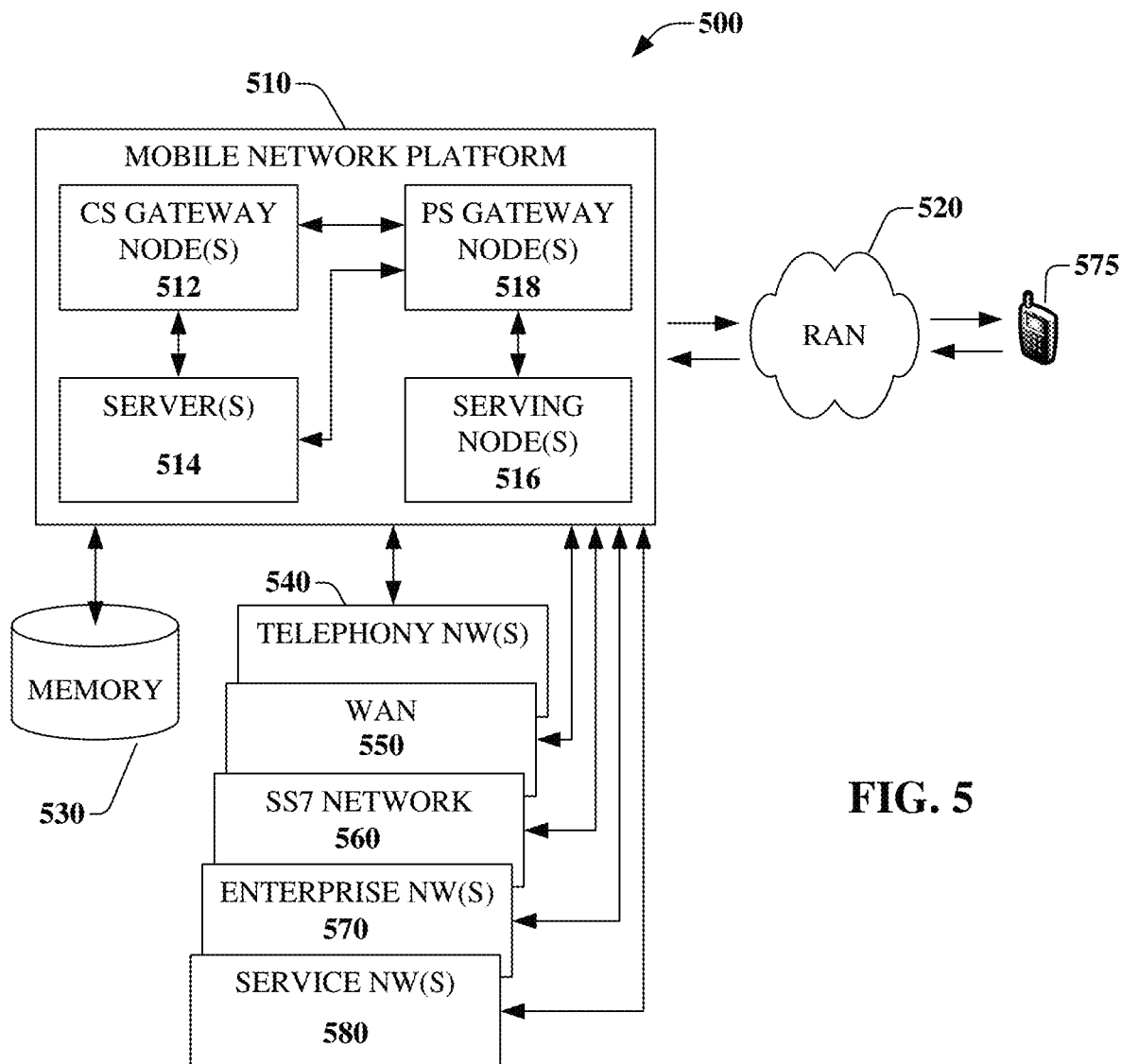
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part presenting, in a first presentation, a first physical object and a first virtual object on a first display in accordance with an execution of a first application invoked by a first user equipment, presenting, in a second presentation, a second physical object and a second virtual object on a second display in accordance with an execution of a second application invoked by a second user equipment, determining that the second virtual object has a conflict with the first physical object, the first virtual object, or a combination thereof, responsive to the determining that the second virtual object has the conflict, resolving the conflict by determining a relative priority between the second virtual object and the first physical object, the first virtual object, or a combination thereof, and modifying the first presentation, the second presentation, or a combination thereof in accordance with the resolving of the conflict. Platform 510 can facilitate in whole or in part invoking a first application that facilitates a first presentation of a first virtual object, a first physical object, or a combination thereof, invoking a second application that facilitates a second presentation of a second virtual object, a second physical object, or a combination thereof, wherein the second application is different from the first application, identifying a conflict between the second virtual object, the second physical object, or the combination thereof, and the first virtual object, the first physical object, or the combination thereof, and responsive to the identifying of the conflict, modifying the first presentation, the second presentation, or a combination thereof. Platform 510 can facilitate in whole or in part presenting a first virtual object in accordance with a first context associated with a first user engaged in a communication session via a first application, presenting a second virtual object in accordance with a second context associated with a second user engaged in the communication session via a second application, identifying a conflict between the presenting of the first virtual object and the presenting of the second virtual object, a presenting of a physical object, or a combination thereof, and responsive to the identifying of the conflict, modifying the first virtual object, the second virtual object, or a combination thereof.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
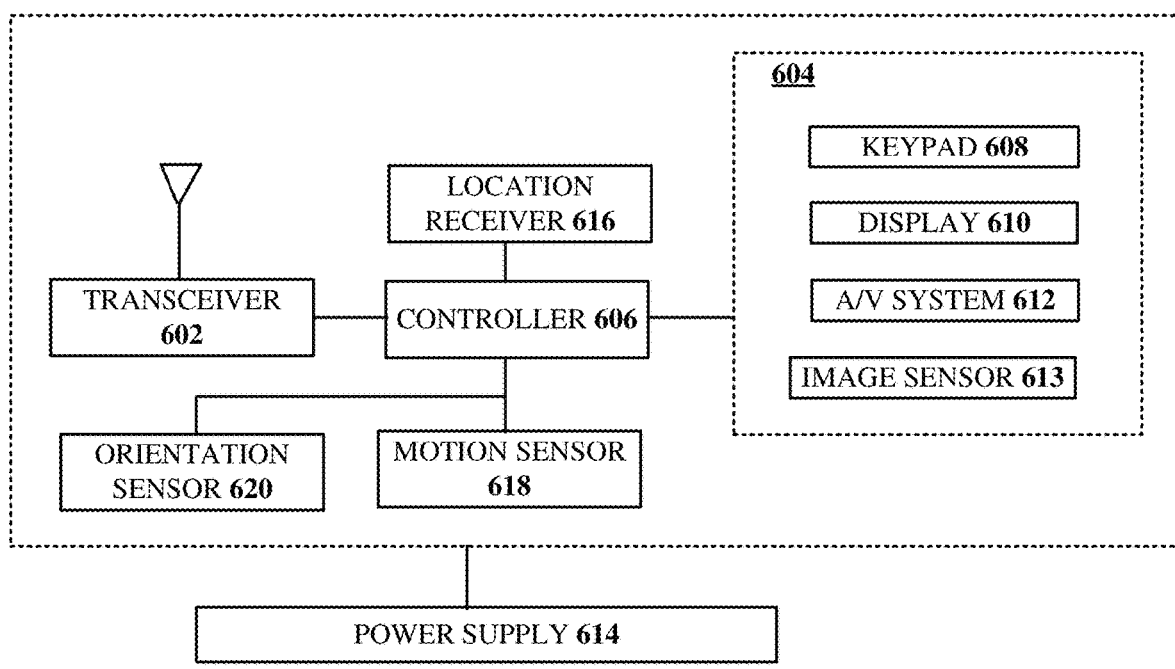
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part presenting, in a first presentation, a first physical object and a first virtual object on a first display in accordance with an execution of a first application invoked by a first user equipment, presenting, in a second presentation, a second physical object and a second virtual object on a second display in accordance with an execution of a second application invoked by a second user equipment, determining that the second virtual object has a conflict with the first physical object, the first virtual object, or a combination thereof, responsive to the determining that the second virtual object has the conflict, resolving the conflict by determining a relative priority between the second virtual object and the first physical object, the first virtual object, or a combination thereof, and modifying the first presentation, the second presentation, or a combination thereof in accordance with the resolving of the conflict. Computing device 600 can facilitate in whole or in part invoking a first application that facilitates a first presentation of a first virtual object, a first physical object, or a combination thereof, invoking a second application that facilitates a second presentation of a second virtual object, a second physical object, or a combination thereof, wherein the second application is different from the first application, identifying a conflict between the second virtual object, the second physical object, or the combination thereof, and the first virtual object, the first physical object, or the combination thereof, and responsive to the identifying of the conflict, modifying the first presentation, the second presentation, or a combination thereof. Computing device 600 can facilitate in whole or in part presenting a first virtual object in accordance with a first context associated with a first user engaged in a communication session via a first application, presenting a second virtual object in accordance with a second context associated with a second user engaged in the communication session via a second application, identifying a conflict between the presenting of the first virtual object and the presenting of the second virtual object, a presenting of a physical object, or a combination thereof, and responsive to the identifying of the conflict, modifying the first virtual object, the second virtual object, or a combination thereof.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A device, comprising:
   a processing system including a processor; and
   a memory that stores executable instructions that, when executed by the processing system, facilitate performance of operations, the operations comprising:

presenting, in a first presentation, a first physical object and a first virtual object on a first display device in accordance with an execution of a first application invoked by a first user equipment corresponding to a first communication device;

presenting, in a second presentation, a second physical object and a second virtual object on a second display device in accordance with an execution of a second application invoked by a second user equipment corresponding to a second communication device that is different from the first communication device;

determining that the second virtual object has a conflict with the first physical object, the first virtual object, or a combination thereof;

responsive to the determining that the second virtual object has the conflict, resolving the conflict by determining a relative priority between the second virtual object and the first physical object, the first virtual object, or a combination thereof; and modifying the first presentation, the second presentation, or a combination thereof in accordance with the resolving of the conflict.

2. The device of claim 1, wherein the first application and the second application are a same application.

3. The device of claim 1, wherein the first display device is integrated as part of the first communication device, and wherein the second display device is integrated as part of the second communication device.

4. The device of claim 1, wherein the determining that the second virtual object has the conflict comprises a determination that the second virtual object has a conflict with the first physical object, the first virtual object, or the combination thereof, at an identified time.

5. The device of claim 1, wherein the modifying of the first presentation, the second presentation, or the combination thereof comprises emphasizing the first physical object, the first virtual object, or a combination thereof, as part of the first presentation.

6. The device of claim 5, wherein the emphasizing comprises applying special effects to the first physical object, the first virtual object, or the combination thereof.

7. The device of claim 1, wherein the modifying of the first presentation, the second presentation, or the combination thereof comprises moving the first virtual object from a first layer of a plurality of layers associated with the first presentation to a second layer of the plurality of layers.

8. The device of claim 1, wherein the second virtual object and the first virtual object are a same virtual object, wherein the same virtual object is accessible at the first communication device via the first application, and wherein the same virtual object is accessible at the second communication device via the second application.

9. The device of claim 1, wherein the operations further comprise:

obtaining a security credential from the second application; and validating the security credential to determine that the second user equipment, a user of the second user equipment, or a combination thereof is authorized to access the second virtual object, wherein the determining that the second virtual object has the conflict is based on the validating of the security credential and is based on an interaction at the second user equipment with the second virtual object.

10. The device of claim 1, wherein the operations further comprise:

determining that a first user of the first user equipment has obtained training, education, or a combination thereof, in relation to a use of the first virtual object; and inserting the first virtual object into the first presentation in response to the determining that the first user has obtained the training, the education, or the combination thereof.

11. The device of claim 1, wherein the operations further comprise:

determining a first interaction by a first user of the first user equipment with the first virtual object as part of the first presentation; and inserting the second virtual object into the second presentation in accordance with the determining of the first interaction.

12. The device of claim 1, wherein the operations further comprise:

monitoring a first environment where the first user equipment is located;

inserting the first virtual object into the first presentation in accordance with the monitoring of the first environment;

monitoring a second environment where the second user equipment is located; and inserting the second virtual object into the second presentation in accordance with the monitoring of the second environment.

13. The device of claim 1, wherein the operations further comprise:

obtaining from the first user equipment a preference associated with a first user of the first user equipment; and inserting the first virtual object into the first presentation in accordance with the preference.

14. The device of claim 13, wherein the preference is obtained from a third application executed by the first user equipment, and wherein the third application is a social media application.

15. A non-transitory machine-readable medium, comprising executable instructions that, when executed by a processing system including a processor, facilitate performance of operations, the operations comprising:

invoking a first application that facilitates a first presentation by a first communication device of a first virtual object, a first physical object, or a combination thereof;

invoking a second application that facilitates a second presentation by a second communication device of a second virtual object, a second physical object, or a combination thereof, wherein the second application is different from the first application, and wherein the second communication device is different from the first communication device;

identifying a conflict between the second virtual object, the second physical object, or the combination thereof, and the first virtual object, the first physical object, or the combination thereof; and responsive to the identifying of the conflict, modifying the first presentation, the second presentation, or a combination thereof.

16. The non-transitory machine-readable medium of claim 15, wherein the first presentation and the second presentation are associated with a first communication session, and wherein the modifying of the first presentation, the second presentation, or the combination thereof comprises initiating a second communication session that incorporates a parameter of the first communication session.

17. The non-transitory machine-readable medium of claim 15, wherein the first presentation includes the first virtual object and the first physical object, wherein the second presentation includes the first virtual object, the second virtual object, and the second physical object, wherein the first virtual object is included in the second presentation in response to a first user interaction with the first virtual object as part of the first presentation, wherein the first user interaction comprises an alteration of a viewing perspective of the first virtual object from a first viewing perspective to a second viewing perspective, and wherein the first virtual object is included as part of the second presentation in accordance with the second viewing perspective.

18. A method, comprising:
    presenting, by a processing system including a processor, a first virtual object in accordance with a first context associated with a first user engaged in a communication session via a first application executed by a first communication device;
    presenting, by the processing system, a second virtual object in accordance with a second context associated with a second user engaged in the communication session via a second application executed by a second communication device that is different from the first communication device;
    identifying, by the processing system, a conflict between the presenting of the first virtual object by the first communication device and the presenting of the second virtual object, a presenting of a physical object, or a combination thereof, by the second communication device; and
    responsive to the identifying of the conflict, modifying, by the processing system, the first virtual object, the second virtual object, or a combination thereof.

19. The method of claim 18, further comprising:
    receiving, by the processing system, a request for a media content item from the first communication device, wherein the first communication device includes a user equipment;
    obtaining, by the processing system, an identification of a preference of a first user of the user equipment in response to the receiving of the request;
    identifying, by the processing system, the first virtual object in accordance with the identification of the preference; and
    streaming the media content item and the first virtual object to the user equipment in accordance with the request and in accordance with the identifying of the first virtual object, wherein the first virtual object comprises a selectable advertisement that facilitates a purchase of a product or a service from a website.

20. The method of claim 18, wherein the second context includes an identification of: a vision parameter, a sound parameter, a depth parameter, a motion parameter, an orientation parameter, a location parameter, a gaze parameter, a temperature parameter, and a recognition of a gesture that corresponds to a command for controlling the physical object.

\* \* \* \* \*